United States Patent [19]
Strähle et al.

[11] Patent Number: 5,449,035
[45] Date of Patent: Sep. 12, 1995

[54] HEAT ACCUMULATOR, IN PARTICULAR LATENT HEAT ACCUMULATOR

[75] Inventors: Roland Strähle, Unterensingen; Stephan Hörz, Filderstadt; Jochen Letsch, Stuttgart, all of Germany

[73] Assignee: Längerer & Reich GmbH & Co., Filderstatdt, Germany

[21] Appl. No.: 72,731

[22] Filed: Jun. 4, 1993

[30] Foreign Application Priority Data

Jul. 28, 1992 [DE] Germany ............. 42 24 873.6

[51] Int. Cl.⁶ .................................. F28D 20/00
[52] U.S. Cl. ........................... 165/10; 165/135
[58] Field of Search .......... 165/10, 135; 285/47, 285/53, 52

[56] References Cited

U.S. PATENT DOCUMENTS 2,980,448  4/1961  Holben ......................... 285/47
5,090,474  2/1992  Schatz ........................... 165/10

FOREIGN PATENT DOCUMENTS 0186515  7/1986  European Pat. Off. .
1067541  10/1959  Germany .
3015257  10/1981  Germany .
4007001  9/1991  Germany .
4007004  9/1991  Germany .
 438262  11/1935  United Kingdom ............ 285/53

Primary Examiner—Allen J. Flanigan
Attorney, Agent, or Firm—Michael J. Striker

[57] ABSTRACT

A heat accumulator, in particular a latent heat accumulator has an inner jacket arranged to surround an accumulator core and an outer jacket surrounding the inner jacket so as to form an insulation chamber therebetween, two conduits extending from the insulating chamber outside and forming a supply conduit and a return conduit for a heat transporting medium and elements for counteracting heat losses and associated with the conduits, each of the conduits in its course having a conduit interruption and being provided with a thermal insulation in the region of the conduit interruption so as to form the heat losses counteracting elements.

26 Claims, 1 Drawing Sheet

HEAT ACCUMULATOR, IN PARTICULAR LATENT HEAT ACCUMULATOR

BACKGROUND OF THE INVENTION

The present invention relates to a heat accumulator, in particular a latent heat accumulator, which has an inner jacket which contains an accumulator core, an outer jacket surrounding the inner jacket at a distance from it to form an insulation chamber, and two conduits extending from the insulation chamber and including a supply conduit and a return conduit for a heat transporting medium, and wherein a device counteracting heat losses is associated with the conduits.

Heat accumulators of this type are known in the art. One of such heat accumulators is disclosed for example in the U.S. Pat. No. 5,090,474. In this heat accumulator the device which counteracts heat losses through the conduits is formed by convection-blocking elements arranged inside the conduits or a thermal insulation by a heat insulating layer, for example of a foam material arranged on the inner wall of the conduit. The convection blocking elements in the interior of the conduit can be formed for example as spiral shaped elements or similar inserts. They are expensive and are contrary to favorable manufacturing principles. An insulating layer which operates as the thermal insulation on the inner side of the conduits reduces the heat losses only insignificantly. Especially when in order to obtain a thermal siphon action the conduits must extend at least approximately vertically and then open in the inner jacket with a tubular knee, substantial manufacturing difficulties arise for introducing the inner thermal insulation.

SUMMARY OF THE INVENTION

Accordingly, it is an object of the present invention to provide a heat accumulator, in particular a latent heat accumulator of the above mentioned type, which avoids the disadvantages of the prior art.

In keeping with these objects and with others which will become apparent hereinafter, one feature of the present invention resides, briefly stated, in a heat accumulator, in particular a latent heat accumulator having inner and outer jackets, two conduits extending from an insulating chamber provided between the jackets and a heat losses counteracting device, wherein each conduit has a conduit interruption in a conduit course, and a thermal insulation is arranged in the region of the conduit interruption.

When the heat accumulator is designed in accordance with the present invention, it eliminates the disadvantages of the prior art. In particular the heat losses caused by the supply and withdrawal conduits can be reduced in a simple manner which is favorable for manufacture.

When the heat accumulator is designed in accordance with the present invention, it is possible to use metal conduits which are accessible for a solder connection with the inner jacket, and thereby to maintain substantially lower heat losses during a heat transportation from the accumulator core outwardly. Due to the conduit interruption of each conduit in its conduit course a heat conductivity through the material is blocked. Since a thermal insulation is arranged in the region of the conduit interruption, this interruption of the heat transfer is guaranteed by the insulation which in the region of the conduit interruption forms bridges which block the heat transporting medium located in the conduit.

Due to the conduit insert extending in its interior, a heat flux which is eventually produced by the heat transporting medium in the conduit and which can bridge the conduit interruption, is additionally blocked. It is further advantageous that with the straight conduits, for example tubes, such as inner conduit insert can be inserted fast and without problems, for example at the end of the mounting and from outside.

In accordance with another feature of the present invention a heat accumulator, in particular latent heat accumulator is proposed, in which the conduits especially in the loaded condition are blockable by closing members. In known heat accumulators the conduits at least substantially must extend vertically for avoiding an automatic heat discharge through the heat transporting medium from the accumulator due to a thermal siphon action when the accumulator is loaded and is in the accumulating condition. Such conduit courses contradict a cost-favorable manufacture. They require a relatively long tube course and thereby corresponding material consumption. Also, they are characterized by the weight increase. Furthermore, the vertically extending tubes with end-side tubular knee are difficult to tightly seal by soldering on the inner jacket. When the above mentioned closure members are provided, these disadvantages are eliminated.

Due to the corresponding closure member, a separation of the operational condition of accumulation on the one hand and loading or unloading of the heat accumulator on the other hand is possible. When the heat accumulator is loaded, the conduits can be closed by transferring the closure member into its blocking position, so that a heat discharge through the heat transporting medium from the accumulator is prevented. In this construction any course for the supply and return conduit is possible, which can extend horizontally. The conduits can be guided over the shortest path from the inner jacket through the insulating chamber to the outer jacket, so that the material used for conduits is as low as possible. Moreover, such a course of the conduit provides for a manufacture-favorable design since the conduits can be connected with remaining components of the heat accumulator in one working step by soldering, welding and the like without special supporting members and other auxiliary means. It is further advantageous that for the heat accumulator no special arrangement in the space is necessary. Moreover, the heat accumulator can be placed in a space in any position, so that depending on the surrounding conditions, an especially place saving arrangement can be selected for example for a motor vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
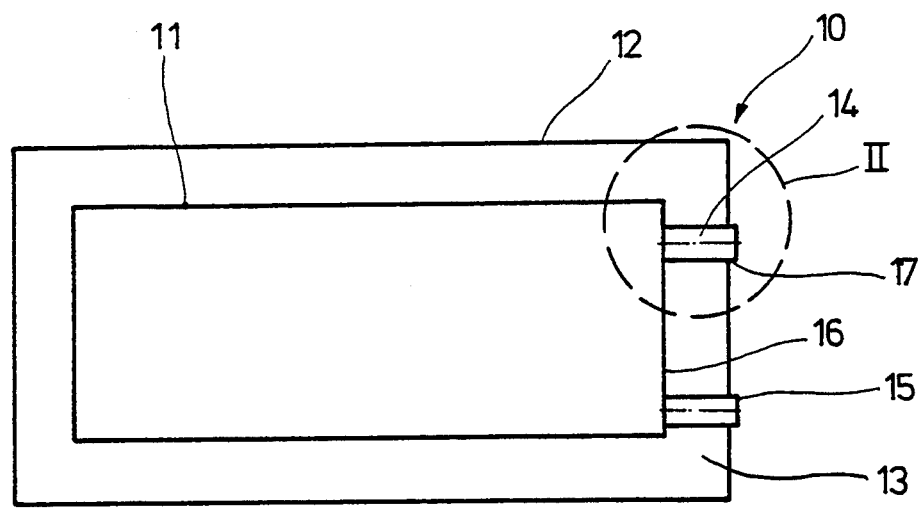
FIG. 1 is a schematic side view of a heat accumulator in accordance with the present invention.

A heat accumulator in accordance with the present invention, in particular a latent heat accumulator, is identified with reference numeral 10 in FIG. 1. It is formed for example as a cylindrical heat accumulator but of course other shapes are possible as well. The heat accumulator 10 can be arranged in any orientation in space. The heat accumulator 10 has a not shown accumulator core in its interior. It forms a device which serves for the heat accumulation and is enclosed by a schematically shown inner jacket 11. The inner jacket 11 is composed of metal, for example aluminum. It is surrounded by an outer jacket 12 at a distance from it. Due to the distance between the inner jacket 11 and the outer jacket 12, an insulating chamber 13 is formed. The chamber can be evacuated and/or can contain a suitable insulating material.

The heat accumulator 10 has further two conduits 14 and 15 which extends outside from the insulating chamber 13 and are formed as tubular conduits. One of these conduits is used as a supply conduit while another conduit is used as a return conduit for a heat transporting medium, for example cooling water of an internal combustion engine.

Figure 2:
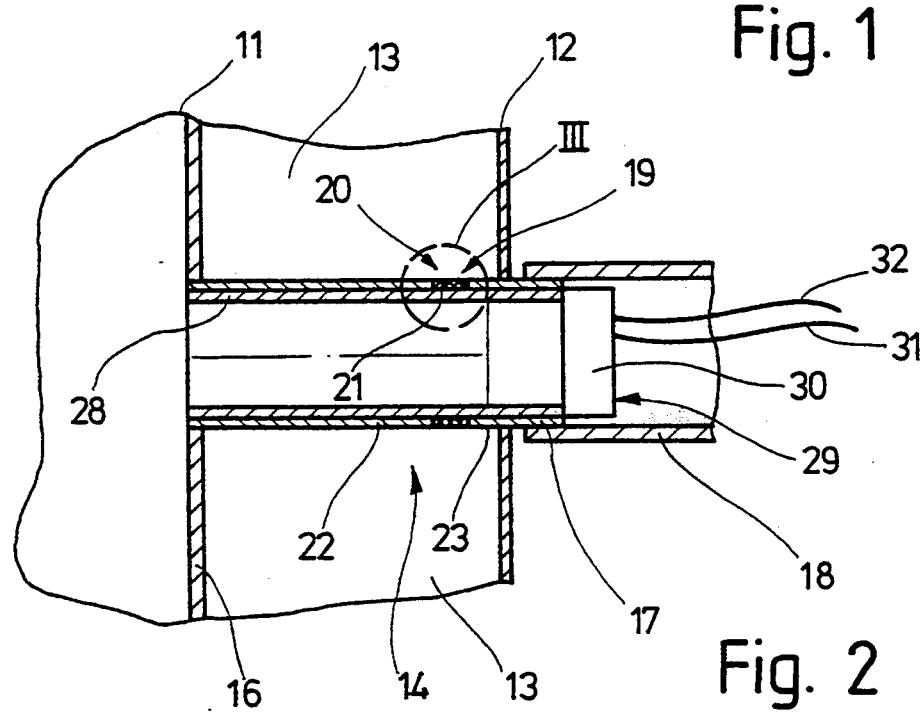
FIG. 2 is a view showing a portion II of the heat accumulator in FIG. 1 on an enlarged scale.
Figure 3:
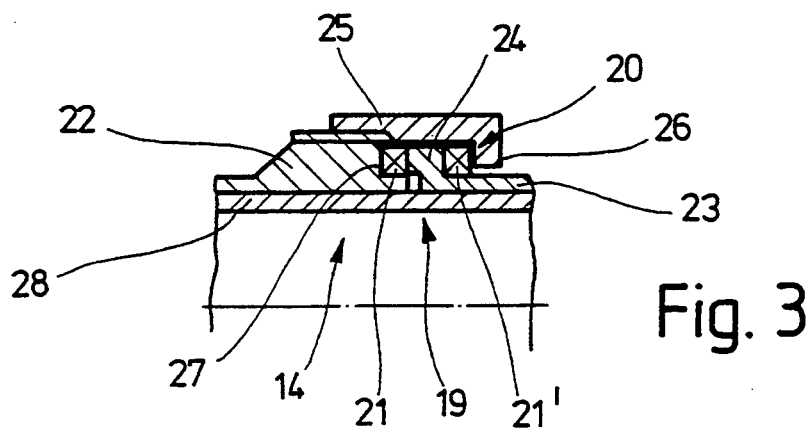
FIG. 3 is a view showing a detail III of the heat accumulator of FIG. 2, on an enlarged scale.

Both conduits 14 and 15 extend for example horizontally as shown in FIGS. 1–3. Since the heat accumulator can be oriented in any position in a space, it is to be understood that the conduits 14 and 15 can also occupy any position. The conduits 14 and 15 open in a facing end wall 16 into an inner container formed by the inner jacket 11. The conduits 14 and 15 are sealingly and firmly connected with the inner jacket 11. As can be seen from FIG. 2 from the conduit 14 the conduit 14 with its conduit portion 17 is guided outwardly through the outer jacket 12. A connecting hose 18 can be mounted on the conduit portion 17 for guiding the heat transporting medium.

A device counteracting heat losses is associated with the conduits 14 and 15 and will be described hereinbelow. The device in accordance with the present invention is designed so that each conduit 14, 15 as will be illustrated for the conduit 14 in FIGS. 2 and 3, has a conduit interruption 19 in its course and a thermal insulation 20 is arranged in the region of the conduit interruption 19. Due to the conduit interruption 19 a heat conduction through the conduit 14 from the accumulator core located inside the inner jacket 11 to the outside and due to the thermal insulation 20 in the insulation of the conduit interruption 19, is interrupted or at least maintained as low as possible.

The thermal insulation 30 has for example at least one thermal insulating element 21 shown in FIG. 2. The thermal insulating element 21 is composed of a material having permanent poor heat conducting properties, and this material simultaneously is permanently mechanically firm and pressure tight. The thermal insulating element 21 is composed in particular of a synthetic plastic material which possesses the above specified properties. As can be seen from FIG. 2, the conduit interruption 19 of each conduit 14, 15 and the thermal insulation 20 can be located adjacent to the outer jacket 12. In the example shown in FIG. 2, the conduit interruption 19 and the thermal insulation 20 are located at a small distance at the left and in the immediate vicinity to the outer jacket 12.

It is to be understood that the conduits 14, 15 which are composed of tubes can be formed as short conduit pieces extending rectilinearly, and the conduits 14 and 15 can pass over the shortest path directly from the inner jacket 11 to the outer jacket 12 and out of the insulating chamber 13. The material consumption for the conduits 14 and 15 is therefore as little as possible. Also, advantages for the manufacture of the heat accumulator 10 are obtained. Since the course of the conduits 14 and 15 can be arbitrary, also can be horizontal as shown in FIGS. 1–3, it has advantages for the spatial arrangement of the heat accumulator 10, for example in a motor vehicle, and further advantages for the connection of the conduits 14, 15 to supplying or withdrawing conduits such as the hose 18 or the like.

Each conduit 14, 15, as shown in the example of the conduit 14 in FIGS. 2 and 3, is composed of two separate conduit pieces 22 and 23. These pieces are arranged for example coaxially relative to one another and form therebetween a separating region in which at least one thermal insulating element 21 is located. The conduit piece 23 has a conduit flange 24 shown in FIG. 3. The conduit piece 22 is provided with a coupling element 25, for example a cap which is screwed on it. The coupling element 25 is provided with an edge 16 at an axial distance from the conduit flange 24. Thermal insulating elements 21 and 21' are arranged at both sides of the conduit flange 24 of the conduit piece 23. During tightening of the coupling element 23 its edge 26 comes to abutment against the insulating element 21' and presses the latter against the associated surface of the conduit flange 24. The conduit flange 24 in turn presses with the opposite surface against the other thermal insulating element 21 and presses against a facing end surface 27 of the other conduit piece 22. The conduit piece 22 extends at an axial distance from the conduit piece 23 so as to form the conduit interruption 19. The conduit interruption is filled with the insulating element 21 which simultaneously is a sealing conduit element for the heat transporting medium guided in the conduit 14 and pressure-tightly seals the conduit interruption 19. The other thermal insulating element 21' prevents a heat conducting bridge between the conduit piece 23, in particular its conduit flange 24 and the coupling element 25.

The conduit pieces 22 and 23 are mechanically fixedly connected with one another by the coupling element 25. However, they are thermally separated from one another by the thermal insulating elements 21 and 21'.

The conduits 14 and 15 are composed of metal, in particular aluminum. They can be connected with the inner jacket 11, in particular its end wall 16, and/or outer jacket 12 by soldering, welding and the like. This simplifies the manufacture of the heat accumulator.

Each conduit 14 and 15, as shown for the conduit 14 in FIGS. 2 and 3, is provided at its interior with a conduit insert 28. The conduit insert 28 extends at least over the region of the conduit interruption 19 and abuts against the inner surface of the conduit 14, in particular the conduit pieces 22 and 23. The conduit insert 28 is composed of a material with poor heat conducting properties, for example of synthetic plastic material. When the conduit insert 28 extends at least over the region of the conduit interruption 18, it prevents a heat flux between both conduit pieces 22 and 23 which can be produced by the heat transporting medium located in the conduit 14.

In the shown embodiment, the conductor insert 28 extends over the whole length of the conduit 14. The same is true for the other conduit 15. The conduit insert 28 is mounted at the end of the mounting of the heat accumulator 10, for example from outside into the corresponding conduit 14 or 15 for example by inserting the insert into the conduit. The conduit insert 28 reduces over its whole length the heat transfer from the conduit 14 to the medium located in the interior of the conduit 14, and also vice versa from this medium to the conduit 14.

A further inventive solution is disclosed in FIG. 2 and can be used for the conduit 14, and also in the same way when needed for another conduit 15. The conduits 14 and 15, as shown for the conduit 14 in FIG. 2, are blockable when needed by a corresponding closure member 29, in particular when the heat accumulator 10 is loaded. When the heat accumulator 10 is loaded, for example after adding for example of the cooling water passage through the heat accumulator 10, for example by shutting off of the internal combustion engine, the heat transporting medium located outside the heat accumulator 10 cools down. Therefore there is a danger of a heat discharge from the heat accumulator 10 by convection through the medium. Since each conduit 14, 15 when needed, especially in the loaded condition of the heat accumulator 10, can be blocked by an associated closure member 29, such a heat discharge from the heat accumulator 10 is prevented. The course of the conduits 14 and 15 can be maintained as short as possible and as shown in FIG. 1, where the conduits 14 and 15 extend horizontally. It is to be understood that the corresponding closure member 29 can be removed or controlled so that it releases the passage through the corresponding conduit 14, 15, when the heat accumulator 10 must be loaded or unloaded.

The corresponding closure member 29 is composed of a material with poor heat conducting properties, so as to minimize heat losses. The corresponding closure member 29 can be formed for example as a plug. As can be seen from FIG. 2, the corresponding closure member 29 is formed as a controllable valve 30 with a control conductor 31 and 32 leading to it. The valve 30 is closeable and openable when needed. For this purpose it is controllable by the control conductor 31, 32 in dependence on an outer side. In particular it is closeable during reaching the loaded condition of the heat accumulator 10. With the control conductors 31 and 32, the valve 30 can obtain a closure command for example when the cooling water passage through the heat accumulator 10 ends, for example when an internal combustion engine is shut off. When the valve 30 is closed, no water discharge from the heat accumulator 10 through the conduit 14 via the medium can occur. This is also true for the conduit 15. When the heat accumulator 10 must be unloaded for example for the purpose of motor preheating or passenger space heating of a motor vehicle, the valve 30 is controlled by the control conductor 31, 32 so that it opens and the medium can flow through the corresponding conduit 14, 15. The same is true for the situation when the heat accumulator 10 must be loaded. The closure member 29, in particular the valve 30, also makes possible a separation of the operational condition of accumulation on the one hand from the loading and unloading condition on the other hand.

It will be understood that each of the elements described above, or two or more together, may also find a useful application in other types of constructions differing from the types described above.

While the invention has been illustrated and described as embodied in a heat accumulator, in particular a latent heat accumulator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A heat accumulator, in particular a latent heat accumulator, having an inner jacket arranged to surround an accumulator core and an outer jacket surrounding said inner jacket so as to form an insulating chamber therebetween; two conduits composed of metal and extending from said insulating chamber outside and forming a supply conduit and a return conduit for a heat transporting medium; and means for counteracting heat losses due to heat conductivity of said metal conduits in a longitudinal direction of said metal conduits and associated with said conduits, each of said conduits in its course having a conduit interruption and being provided with a thermal insulation in the region of said conduit interruption so as to form said heat losses counteracting means.

2. A heat accumulator as defined in claim 1, wherein said thermal insulation includes at least one thermal insulating element.

3. A heat accumulator as defined in claim 2, wherein said thermal insulating element is composed of a material with poor heat conducting properties.

4. A heat accumulator as defined in claim 2, wherein said thermal insulating element is composed of a permanently mechanically strong material.

5. A heat accumulator as defined in claim 2, wherein said thermal insulating element is composed of a permanent pressure tight material.

6. A heat accumulator as defined in claim 2, wherein said thermal insulating element is composed of a synthetic plastic material.

7. A heat accumulator as defined in claim 1, wherein said conduit interruption and said thermal insulation are located adjacent to said outer jacket.

8. A heat accumulator as defined in claim 1, wherein each of said conduits is composed of two separate conduit pieces with a separating region therebetween, said thermal insulation including at least one thermal insulating element arranged in said separating region.

9. A heat accumulator as defined in claim 1, wherein each of said conduits is composed of two conduit pieces with a separating region therebetween; and further comprising a coupling element which mechanically connects said conduit pieces with one another while said conduit pieces are separated from one another thermally by said thermal insulation.

10. A heat accumulator as defined in claim 1, wherein said conduits are composed of metal.

11. A heat accumulator as defined in claim 10, wherein said conduits are composed of aluminum.

12. A heat accumulator as defined in claim 1, wherein said conduits are connected with at least one of said jackets; and further comprising means for connecting said conduits with at least one of said jackets.

13. A heat accumulator as defined in claim 12, wherein said connecting means is means selected from the group consisting of soldering means and welding means.

14. A heat accumulator as defined in claim 1; and further comprising a conduit insert arranged in each conduit and extending at least over a region of said conduit interruption and also composed of a material with poor heat conducting properties.

15. A heat accumulator as defined in claim 14, wherein said conduit insert is composed of a synthetic plastic material.

16. A heat accumulator as defined in claim 1; and further comprising closure members arranged to block said conduits.

17. A heat accumulator as defined in claim 16, wherein said closure members block said conduits when the heat accumulator is in loaded condition.

18. A heat accumulator as defined in claim 16, wherein said closure members are composed of a material with poor heat conducting properties.

19. A heat accumulator as defined in claim 16, wherein said closure members are formed as plugs.

20. A heat accumulator as defined in claim 16, wherein each of said closure members is formed as a controllable valve.

21. A heat accumulator as defined in claim 20, wherein said valve is formed as an openable and closeable valve.

22. A heat accumulator as defined in claim 20; and further comprising a control conductor by which said closure member is controlled in dependence on outer sizes.

23. A heat accumulator as defined in claim 22, wherein said closure member is controlled by said control conductor so as to close said closure member in loaded condition of the heat accumulator.

24. A heat accumulator, in particular a latent heat accumulator, having an inner jacket arranged to surround an accumulator core and an outer jacket surrounding said inner jacket so as to form an insulating chamber therebetween; two conduits extending from said insulating chamber outside and forming a supply conduit and a return conduit for a heat transporting medium; and means for counteracting heat losses and associated with said conduits, each of said conduits in its course having a conduit interruption and being provided with a thermal insulation in the region of said conduit interruption so as to form said heat losses counteracting means, each of said conduits being composed of two separate conduit pieces with a separating region therebetween, at least one of said conduit pieces having a conduit flange, said thermal insulation including a thermal insulating element arranged at every side of said conduit flange.

25. A heat accumulator, in particular a latent heat accumulator, having an inner jacket arranged to surround an accumulator core and an outer jacket surrounding said inner jacket so as to form an insulating chamber therebetween; two conduits extending from said insulating chamber outside and forming a supply conduit and a return conduit for a heat transporting medium; means for counteracting heat losses and associated with said conduits, each of said conduits in its course having a conduit interruption and being provided with a thermal insulation in the region of said conduit interruption so as to form said heat losses counteracting means; a conduit insert arranged in each conduit and extending at least over a region of said conduit interruption and also composed of a material with poor heat conducting properties, said conduit insert abutting against an inner surface of each of said conduits.

26. A heat accumulator, in particular a latent heat accumulator, having an inner jacket arranged to surround an accumulator core and an outer jacket surrounding said inner jacket so as to form an insulating chamber therebetween; two conduits extending from said insulating chamber outside and forming a supply conduit and a return conduit for a heat transporting medium; and means for counteracting heat losses and associated with said conduits, each of said conduits in its course having a conduit interruption and being provided with a thermal insulation in the region of said conduit interruption so as to form said heat losses counteracting means; a conduit insert arranged in each conduit and extending at least over a region of said conduit interruption and also composed of a material with poor heat conducting properties, said conduit insert extending over a whole length of said conduit.

* * * * *